Oct. 2, 1934.  W. D. EGLINTON  1,975,685
SPECTACLE FRAME
Filed March 29, 1930
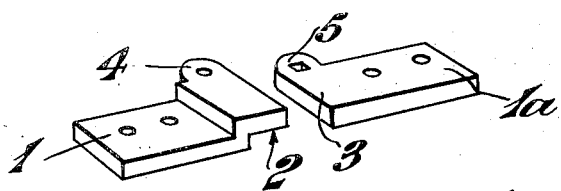
Fig.1.
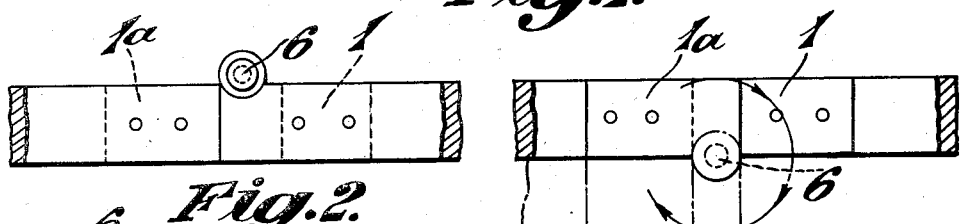
Fig.2.
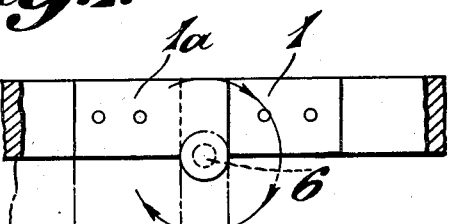
Fig.4.
Fig.3.
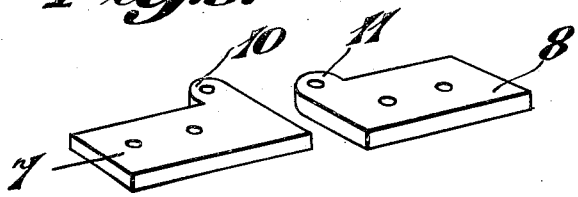
Inventor:
William David Eglinton Patented Oct. 2, 1934

1,975,685

UNITED STATES PATENT OFFICE 1,975,685

SPECTACLE FRAME

William David Eglinton, Croydon, England

Application March 29, 1930, Serial No. 440,125
In Great Britain April 4, 1929

1 Claim. (Cl. 16—191)

This invention relates to spectacle frames, and has for its object to provide a hinge especially applicable to that type of spectacle frame which can be folded up for insertion in a case, in which spectacle frame the sides are hinged between the front of the spectacle frame and the ends of the sides so that the sides can be folded downwardly upon themselves towards the front of the spectacle frame, or where the spectacle frame is hinged across the nose-piece, or it may equally well be applied to any hinged portion of a spectacle frame for which it may be found suitable.

It is frequently desirable that spectacle frames be folded up into relatively small compass, especially when, as in modern practice, the frames are made of tortoise-shell or similar fragile material. The sides of a spectacle frame, owing to their length, sometimes project when folded, beyond the ends of the front or eye-glass portion of the frame, with the result that owing to the fragile nature of the material forming the frame sides, breakage of the projecting portions of the sides is liable to occur. The provision of hinges on these sides and on other portions of the spectacle frame such as the nose-piece ensures that an otherwise considerable and accordingly fragile length of tortoise-shell or the like is divided into sections, and is therefore much less fragile and accordingly it has been proposed to fold the sides and other parts.

It is also desirable however, that the hinges employed for this purpose do not detract either from the appearance of the spectacle frame or from the comfort of the wearer, and with this object in view the hinge according to the present invention is such that it can be constructed so that there is an absence of any projection on the spectacle frame owing to the presence of the hinge, and the outer surface of the spectacle frame need show little or no indication of there being a hinge provided thereon.

Accordingly the present invention resides in the special construction of hinge for spectacle frames comprising essentially two members one of which is shaped or recessed for part of its length in order to receive the other, and having a pivot adjacent the shaped portion whereby the two members may pivot relatively to each other the plane of the abutting or adjacent surfaces of both members being always the same.

The hinge members are applied to the portions of the spectacle frame which it is desired to interconnect, on the inner surface of the spectacle frame, which is recessed to receive them so that when attached to the spectacle frame the hinge members are flush with the surface of the frame.

In order that the invention may be readily understood and carried into practice reference is hereby made to the accompanying drawing, wherein Figure 1 shows in perspective the two parts of one form of hinge constructed in accordance with my invention.

Figures 2 and 3 are elevational and plan views of the hinge the parts of which are shown in Figure 1, applied to the legs of a spectacle.

Figure 4 is a similar view to Figure 2 viewed from the other side.

Referring to the drawing and particularly to Figures 1, 2, 3 and 4 the numeral 1 designates one of the parts of the hinge which is shaped or recessed at 2 to receive the end 3 of the other part 1a of the hinge. The parts are provided with lugs 4 and 5 which accommodate the pivot pin 6 and both parts of the hinge are pinned to the sides, for instance, of the spectacle the spectacle side being shaped or recessed to receive the hinge parts so that these hinge parts lie flush with the surface of the sides. Thus the side can be folded about the hinge pivot 6 the folding parts always being in the same plane.

As before indicated, an advantage of hinges constructed in accordance with my invention is that they can be arranged so that the parts lie flush with the sides and are very inconspicuous.

Although the invention is primarily intended for use in relation to tortoise shell and like spectacles for which it will be understood that it is applicable to spectacles of metal or any other material.

What I claim and desire to secure by Letters Patent is:—

A hinge for spectacle legs comprising one member recessed on one side and at one end to accommodate a spectacle leg and on the other side at the other end to accommodate the end of a second hinge member, a lug projecting laterally on one side of the first hinge member, a second hinge member having a lug projecting from one side in correspondence with the lug of the first hinge member and a pivot pin connection passing through the two lugs.

WILLIAM DAVID EGLINTON.